United States Patent
Balasubramanian et al.

(10) Patent No.: US 12,493,203 B2
(45) Date of Patent: Dec. 9, 2025

(54) VISION BASED AIRCRAFT CABIN AMBIENT LIGHT CONTROL

(71) Applicant: Rosemount Aerospace Inc., Burnsville, MN (US)

(72) Inventors: Rameshkumar Balasubramanian, Karnataka (IN); Joseph T. Pesik, Eagan, MN (US)

(73) Assignee: Rosemount Aerospace, Inc., Burnsville, MN (US)

( * ) Notice: Subject to any disclaimer, the term of this patent is extended or adjusted under 35 U.S.C. 154(b) by 570 days.

(21) Appl. No.: 17/934,330

(22) Filed: Sep. 22, 2022

(65) Prior Publication Data
US 2023/0122842 A1    Apr. 20, 2023

(30) Foreign Application Priority Data
Oct. 18, 2021    (IN) .............................. 202141047242

(51) Int. Cl.
| | | |
|---|---|---|
| G02F 1/01 | (2006.01) | |
| B64C 1/14 | (2006.01) | |
| B64D 11/00 | (2006.01) | |
| B64D 45/00 | (2006.01) | |
| B64D 47/08 | (2006.01) | |

(52) U.S. Cl.
CPC .......... *G02F 1/0121* (2013.01); *B64C 1/1484* (2013.01); *B64D 11/00* (2013.01); *B64D 45/00* (2013.01); *B64D 47/08* (2013.01); *B64D 2011/0038* (2013.01); *B64D 2045/009* (2013.01)

(58) Field of Classification Search
CPC ..... G02F 1/0121; B64C 1/1484; B64D 11/00; B64D 45/00; B64D 47/08; B64D 2011/0038; B64D 2045/009
See application file for complete search history.

(56) References Cited

U.S. PATENT DOCUMENTS

| | | |
|---|---|---|
| 7,505,604 B2 | 3/2009 | Zakrzewski et al. |
| 8,292,228 B2 | 10/2012 | Mitchell et al. |
| 8,380,393 B1 | 2/2013 | Ohtomo |
| 9,415,745 B1 | 8/2016 | Clemen et al. |
| 10,744,936 B1 | 8/2020 | Budhia et al. |
| 2019/0064408 A1 | 2/2019 | Smit |
| 2019/0318599 A1 | 10/2019 | Ryder |
| 2020/0107419 A1 | 4/2020 | Lee |

OTHER PUBLICATIONS

Extended European Search Report for EP Application No. 22202217.0, Dated Jun. 9, 2023, pp. 13.
Communication pursuant to Article 94(3) EPC for European Patent Application No. 22202217.0, dated Feb. 13, 2025, 6 pages.
Partial European Search Report for EP Application No. 22202217.0, Dated Feb. 15, 2023.

*Primary Examiner* — Jack Dinh
(74) *Attorney, Agent, or Firm* — Kinney & Lange, P.A.

(57) ABSTRACT

A vision-based aircraft cabin light monitoring/control system is used to maintain the light intensity level within the aircraft cabin at a desired level. The system uses video cameras to continuously monitor the ambient light entering the passenger cabin windows, analyzes the video stream/feed to identify the light intensity level within the cabin, identifies the window whose state should be controlled, and generates commands to control the window through central cabin controllers. The system further compensates for light sources internal to the cabin and monitors the phase of flight to ensure compliance to specific light conditions within the aircraft cabin.

9 Claims, 9 Drawing Sheets

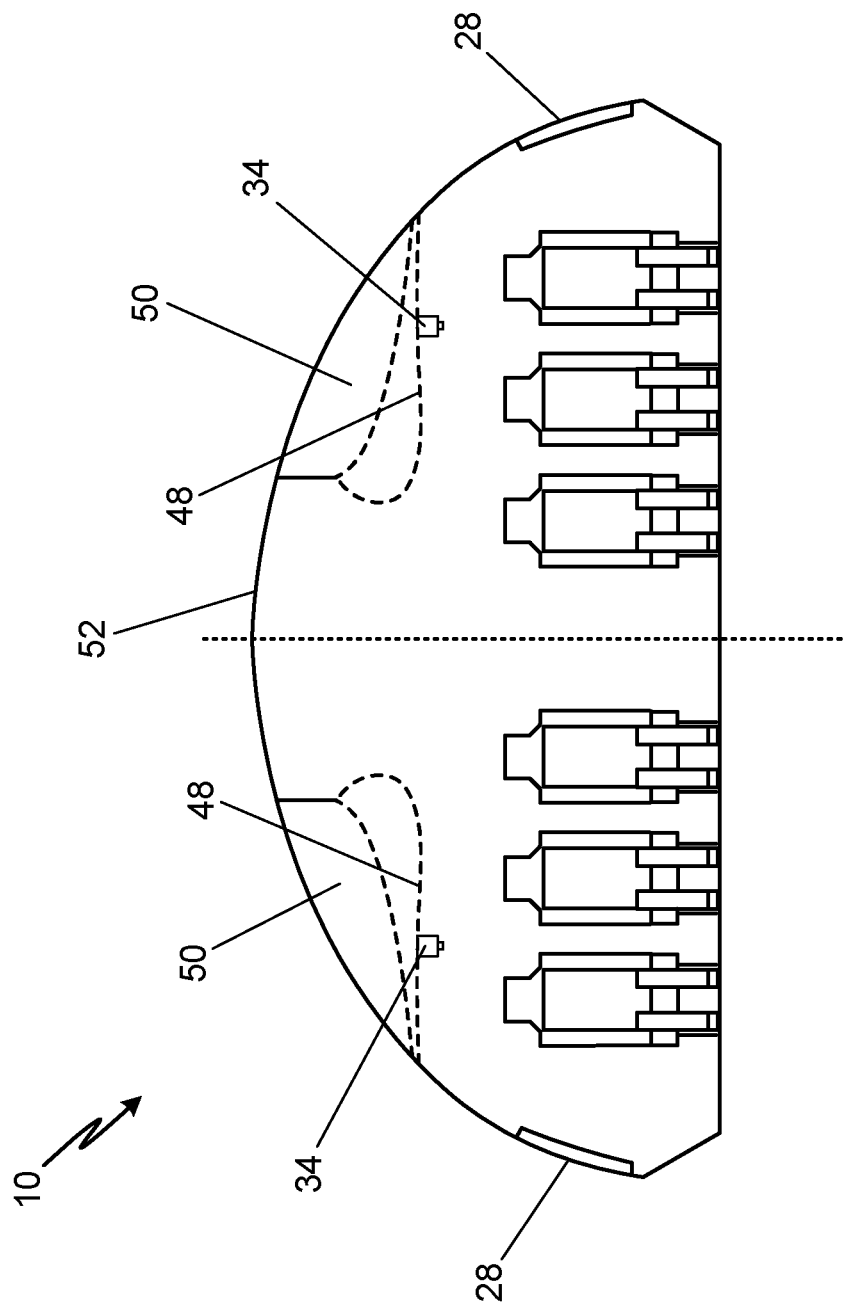

VISION BASED AIRCRAFT CABIN AMBIENT LIGHT CONTROL

CROSS-REFERENCE TO RELATED APPLICATION(S)

This application claims the benefit of India Provisional Application No. 202141047242 filed Oct. 18, 2021 for "VISION BASED AIRCRAFT CABIN AMBIENT LIGHT CONTROL" are hereby incorporated by reference in their entirety.

BACKGROUND

The present invention relates to aircraft cabin light control and, more particularly, to a system for continuously monitoring and controlling the ambient light entering the aircraft cabin.

Traditional aircraft cabin window shades are operated manually by each passenger to either open or close the window shade by sliding the window shade up or down, respectively. More recent aircrafts have electrically dimmable windows that allow the passengers to press a button to control the opacity level of the electrically dimmable windows. In either case, during takeoff and landing of the aircraft the flight crew typically requests passengers to open the window shades (low opacity level) to allow light to enter the aircraft cabin and allow situational awareness for the passengers within the cabin. Additionally, during nighttime flights the flight crew typically requests passengers to close the window shades (high opacity level) to prevent light from entering the aircraft cabin to allow passengers to sleep during the flight. Further, in both cases (traditional window shades and electrically dimmable windows) the flight crew is required to physically inspect the state of each window, ensuring the windows are in the desired state based on the phase of flight of the aircraft.

SUMMARY

According to one aspect of the disclosure, an aircraft cabin ambient light control system for monitoring and controlling the light intensity level within an aircraft cabin is disclosed. The system includes a dimmable window having an electrically controllable opacity level, a central cabin controller electrically coupled to the dimmable window, and an ambient light controller electrically coupled to the central cabin controller. The ambient light controller comprises a processing unit electrically coupled to a plurality of cameras and a communication interface. The plurality of cameras continuously capture video within the aircraft cabin and transfer the video stream to the processing unit. The processing unit analyzes the video and identifies a light intensity level within the aircraft cabin. The communication interface sends data to the electrically coupled central cabin controller. The central cabin controller sends a command signal to the dimmable window to control the opacity level of the dimmable window.

According to another aspect of the disclosure, a method of operating an aircraft cabin ambient light control system is disclosed. The method includes continuously capturing, by a plurality of cameras positioned with an aircraft cabin, a video stream. Identifying, by a processing unit, ambient light entering the aircraft cabin. Calculating, by the processing unit, a peak light intensity of the ambient light entering the aircraft cabin. Comparing, by the processing unit, the peak light intensity to a cabin light intensity threshold. Identifying, by the processing unit, an angle of the peak light intensity entering the aircraft cabin to locate a dimmable window of interest. Adjusting an opacity level of the dimmable window if the peak light intensity entering the aircraft cabin deviates from the cabin light intensity threshold.

According to yet another aspect of the disclosure, a method of identifying a fire within an aircraft cabin is disclosed. The method includes continuously capturing, by a plurality of cameras positioned with an aircraft cabin, a video stream. Identifying, by a processing unit, light within the aircraft cabin. Calculating, by the processing unit, a peak light intensity of the light within the aircraft cabin. Comparing, by the processing unit, the peak light intensity to a predefined fire light intensity threshold value. Identifying, by the processing unit, the presence of fire within the aircraft cabin upon the peak light intensity exceeding the predefined fire light intensity threshold value.

BRIEF DESCRIPTION OF THE DRAWINGS

FIG. 2A is an illustration of a first example location of cameras within an aircraft.

DETAILED DESCRIPTION

A vision-based aircraft cabin light monitoring/control system is used to maintain the light intensity level within the aircraft cabin at a desired level. The system uses video cameras to continuously monitor the ambient light entering the passenger cabin windows, analyzes the video stream/feed to identify the light intensity level within the cabin, identifies the window whose state should be controlled, and generates commands to control the window through central cabin controllers. The system further compensates for light sources internal to the cabin and monitors the phase of flight to ensure compliance to specific light requirements within the aircraft cabin.

Figure 1:
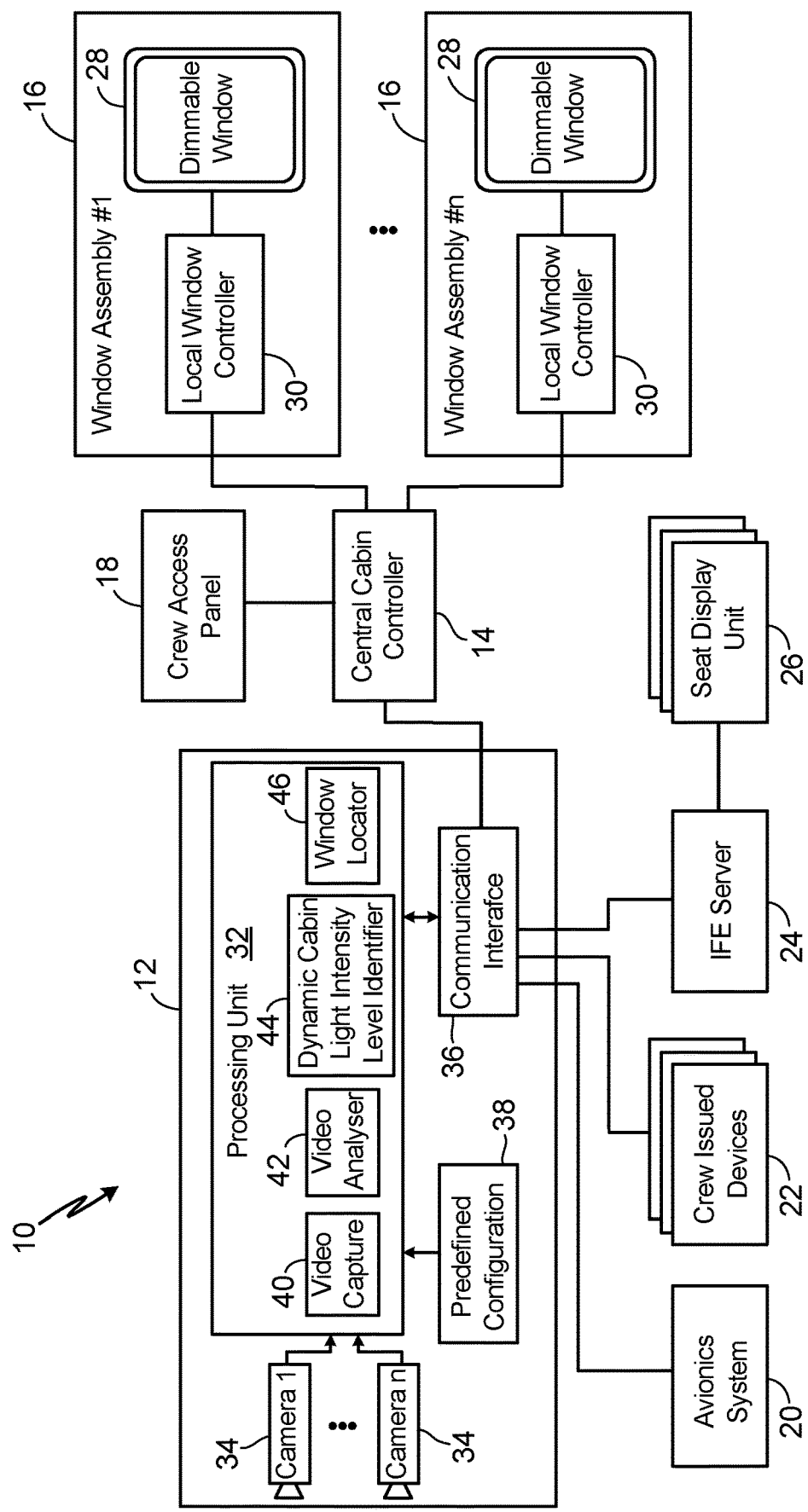
FIG. 1 is a schematic block diagram of a representative aircraft cabin ambient light control system.

FIG. 1 is a schematic block diagram of a representative aircraft cabin ambient light control system 10, hereinafter referred to as system 10. System 10 is installed on an aircraft (not shown), and system 10 is configured to continuously monitor and control the light intensity level within the cabin of an aircraft. System 10 includes ambient light controller 12, central cabin controller 14, window assembly 16, crew access panel 18, avionics system 20, crew issued devices 22, inflight entertainment (IFE) server 24, and seat display unit 26. Ambient light controller 12 is electrically coupled to central cabin controller 14, avionics system 20, crew issued devices 22, and IFE server 24. Central cabin controller 14 is electrically coupled to ambient light controller 12, crew access panel 18, and each window assembly 16. IFE server 24 is electrically coupled to each seat display unit 26 within the aircraft.

Ambient light controller 12 is an electronic assembly configured to capture and process video from within the aircraft cabin to identify the light intensity level within the aircraft cabin. Central cabin controller 14 is an electronic assembly configured to control the general operation of electronic components within the aircraft cabin, such as operation of the lights, fans, crew member alerts, etc. Window assembly 16 includes dimmable window 28 and local window controller 30; an aircraft can include a plurality of window assemblies 16. Crew access panel 18 is an interface unit that allows aircraft crew members to control operations within the aircraft cabin. Avionics system 20 can also be referred to as the flight management system (FMS) of the aircraft. Avionics system 20 is configured to automate and control a wide variety of in-flight tasks, such as controlling the location of the airplane in the sky through flight plan management. Crew issued devices 22 allow aircraft crew members to control operations within the aircraft cabin through portable devices, such as tablets, smartphones, smart watches, etc. In-flight entertainment (IFE) server 24 is an electronic assembly configured to control operation of the passenger seat display units 26, providing interactive maps, audio/visual entertainment, and passenger display messages, among other operations on the passenger seat display units 26 in front of each passenger on the aircraft. Each of the respective components will be discussed in detail below.

Window assembly 16 includes dimmable window 28 and local window controller 30. In the schematic block diagram of FIG. 1, two window assemblies 16 are illustrated for clarity purposes, but it is to be understood that an aircraft can include a plurality of window assemblies 16 such that an aircraft can include many more than two window assemblies 16. The number of window assemblies 16 will depend on a variety of factors, such as the length and overall size of the aircraft. Each window assembly 16 installed on an aircraft includes dimmable window 28 electrically coupled to local window controller 30. Dimmable window 28 is an aircraft window having an electrically controllable opacity level. As such, an electric current can be transferred to dimmable window 28 to increase or decrease the opacity level of dimmable window 28. Dimmable window 28 having a low opacity level is a window that is more transparent (0% opacity is a fully transparent window). Dimmable window 28 having a high opacity level is a window that is less transparent (100% opacity is a fully non-transparent window). Dimmable window 28 can be adjusted such that dimmable window 28 can have an opacity level ranging between 0% opacity and 100% opacity. For example, dimmable window 28 can be adjusted to a 50% opacity level, which will let some light into the aircraft cabin while preventing full light from entering the aircraft cabin. A single local window controller 30 is electrically coupled to each dimmable window 28 on the aircraft. Local window controller 30 is positioned between dimmable window 28 and central cabin controller 14, and local window controller 30 is configured to transfer electrical signals to dimmable window 28 to control/adjust the opacity level of dimmable window 28.

Central cabin controller 14 is an electronic assembly configured to control the general operation of electronic components within the aircraft cabin, such as operation of the lights, fans, crew member alerts, etc. Central cabin controller 14 is electrically coupled to each window assembly 16 on the aircraft, crew access panel 18, and ambient light controller 12. More specifically, central cabin controller 14 is electrically coupled to local window controller 30 of window assembly 16. Central cabin controller 14 is configured to send electrical signals to local window controller 30, indicating whether local window controller 30 should adjust the opacity level of dimmable window 28. Further, central cabin controller 14 is configured to send electrical signals to and receive electrical signals from crew access panel 18. Crew access panel 18 can be a graphical user interface (GUI), knob, switch, button, or the like that allows an aircraft crew member to control components within the aircraft cabin. As such, an aircraft crew member can interact with crew access panel 18 to manually control the opacity level of each dimmable window 28 on an aircraft. In addition, the aircraft crew member can interact with crew access panel 18 to allow or prevent an aircraft passenger from adjusting the opacity level of a dimmable window 28 on the aircraft, discussed further with reference to FIGS. 3A-3B. Central cabin controller 14 is also configured to send electrical signals to and receive electrical signals from ambient light controller 12.

Ambient light controller 12 is an electronic assembly configured to capture and process video from within the aircraft cabin to identify the light intensity level within the aircraft cabin. Ambient light controller 12 includes processing unit 32, a plurality of cameras 34, communication interface 36, and predefined configurations 38. Further, processing unit 32 includes video capture module 40, video analyzer module 42, light intensity level identifier module 44, and window locator module 46. Processing unit 32 is electrically coupled to the plurality of cameras 34, communication interface 36, and predefined configurations 38, and processing unit 32 is configured to send data/electrical signals to and receive data/electrical signals from each respective component. Processing unit 32 can be any electronic circuitry capable of executing the functions/instructions described below.

The plurality of cameras 34 can be one or more high resolution cameras installed across various locations within the aircraft cabin. Further, the plurality of cameras 34 can be low-light sensing, wide-angle field of view cameras that include night vision, thermal vision, and image/video stabilization capabilities. In some examples, each of the plurality of cameras 34 can include built-in infrared illuminators to aid in the vision/video capabilities of the plurality of cameras 34 in low-light conditions. In other examples, each of the plurality of cameras 34 can have separate infrared illuminators positioned adjacent the plurality of cameras 34 to aid in the vision/video capabilities of the plurality of cameras 34 in low-light conditions. Each of the plurality of cameras 34 are electrically coupled to processing unit 32 to transfer data to processing unit 32. More specifically, the plurality of cameras 34 are configured to continuously capture video within the aircraft cabin and then transfer the video stream to the electrically coupled processing unit 32 for processing. In some examples, the video stream captured by the plurality of cameras 34 can be a real-time video stream from the plurality of cameras 34.

Figure 2B:
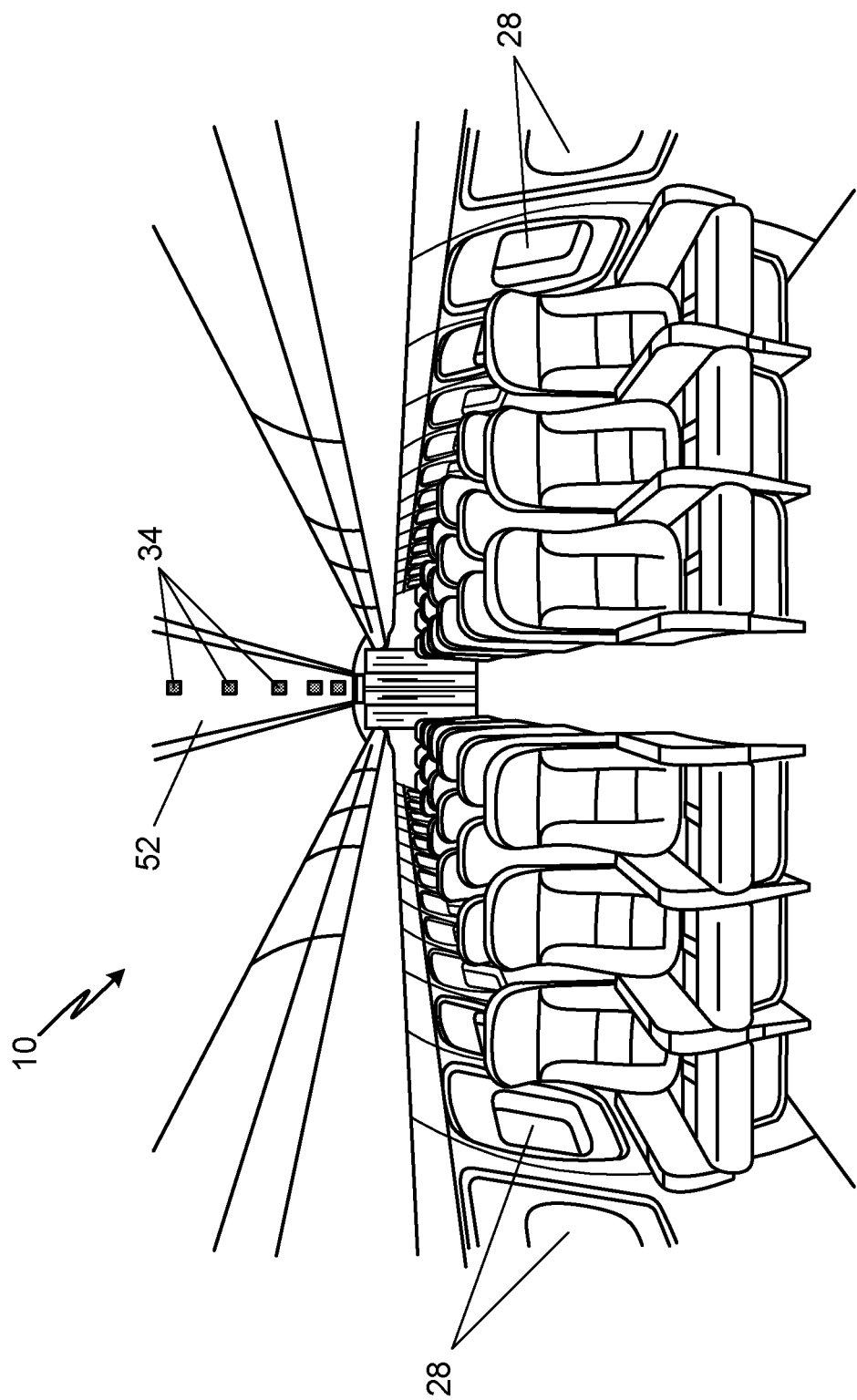
FIG. 2B is an illustration of a second example location of cameras within an aircraft.
Figure 2C:
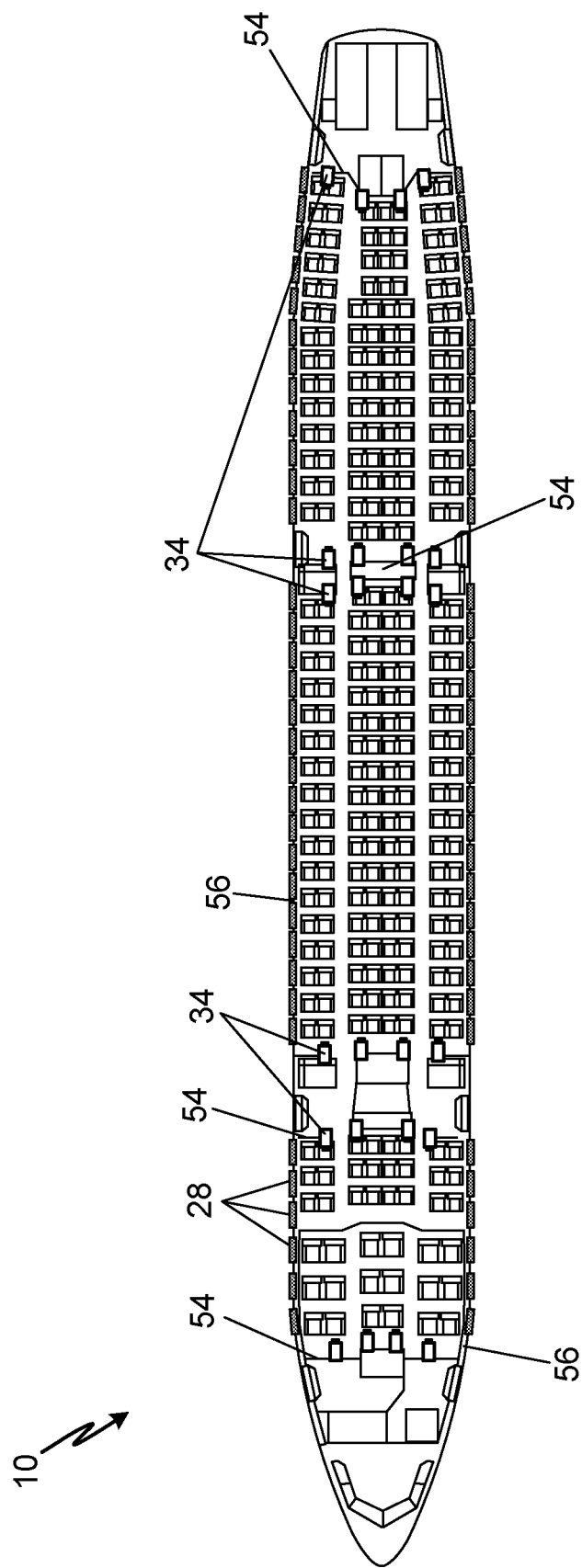
FIG. 2C is an illustration of a third example location of cameras within an aircraft.

FIG. 2A is an illustration of a first example location of cameras 34 within an aircraft. FIG. 2B is an illustration of a second example location of cameras 34 within an aircraft. FIG. 2C is an illustration of a third example location of cameras 34 within an aircraft. FIGS. 2A-2C will be discussed together. As discussed, the plurality of cameras 34 can be installed across various locations within the aircraft cabin. Each of FIGS. 2A-2C illustrate example locations for the plurality of cameras 34 within the aircraft cabin. It is to be understood that the camera 34 locations illustrated are only examples and that the plurality of cameras 34 can be positioned at other locations within the aircraft cabin. For example, a combination of each of the first example location, second example location, and third example locations could be used to position the plurality of cameras 34 within the aircraft cabin.

FIG. 2A illustrates an example in which each of the plurality of cameras 34 are installed on overhead panel 48 positioned above the aircraft passengers and below overhead bin 50, along a length of the aircraft cabin. In some examples, each of the plurality of cameras 34 installed on overhead panel 48 are positioned adjacent the light and fan controls for each aircraft passenger. In the example shown in FIG. 2A, each camera 34 faces downward toward the floor of the aircraft and the field of view of cameras 34 is wide enough to capture video of each dimmable window 28 on the aircraft. In some examples, one camera 34 is required for each dimmable window 28 on the aircraft. In other examples, one camera 34 is required for every other dimmable window 28 on the aircraft. In yet other examples, one camera 34 can capture video of two or more dimmable windows 28 on the aircraft.

FIG. 2B illustrates an example in which each of the plurality of cameras 34 are installed on ceiling 52 of the aircraft cabin, generally in the center and along a length of the aircraft cabin. In the example shown in FIG. 2B, each camera 34 faces downward toward the floor of the aircraft and the field of view of cameras 34 is wide enough to capture video of each dimmable window 28 on the aircraft. In some examples, one camera 34 is required for each dimmable window 28 on the aircraft. In other examples, one camera 34 is required for every other dimmable window 28 on the aircraft. In yet other examples, one camera 34 can capture video of two or more dimmable windows 28 on the aircraft.

FIG. 2C illustrates an example in which each of the plurality of cameras 34 are installed on cabin divider walls 54 of the aircraft cabin, such that cameras 34 are installed looking forward and aft within the aircraft cabin. More specifically, the plurality of cameras 34 are installed such that some of the plurality of cameras 34 face in the forward direction and some of the plurality of cameras 34 face in the aft direction. As an alternative embodiment, each of the plurality of cameras 34 could be installed on side walls 56 of the aircraft instead of the divider walls 54, such that the plurality of cameras 34 are configured to view across the aisles within the aircraft. In both examples, the plurality of cameras 34 are installed such that each dimmable window 28 within the aircraft cabin is within the field of view of at least one of the plurality of cameras 34. As such, one camera 34 is not needed for every dimmable window 28 within the aircraft cabin. Therefore, in some examples, one camera 34 is required for every other dimmable window 28 on the aircraft. In other examples, one camera 34 can capture video of two or more dimmable windows 28 on the aircraft.

The number of cameras 34 for each of the example locations shown in FIGS. 2A-2C will depend on a variety of factors. For example, the length of the aircraft will likely be a factor in determining the required number of cameras 34 within the aircraft. In addition, the field of view of each camera 34 and the number of dimmable windows 28 each of the plurality of cameras 34 can view will dictate the number of cameras 34 required within the aircraft. In any case, the plurality of cameras 34 are installed within the aircraft cabin such that each dimmable window 28 within the aircraft cabin is within the field of view of at least one of the plurality of cameras 34. Further, each of the plurality of cameras 34 are uniquely identified and the installation location, direction of view, field of view, and other information is uploaded into processing unit 32. This allows processing unit 32 to identify which dimmable window(s) 28 each of the plurality of cameras 34 can view and monitor. As such, the plurality of cameras 34 are configured to continuously capture video of each dimmable window 28 within the aircraft cabin, and then transfer the video stream to the electrically coupled processing unit 32 for processing.

Referring again to FIG. 1, processing unit 32 is configured to perform many tasks/operations after receiving the video stream from the plurality of cameras 34. More specifically, processing unit 32 is configured to analyze the video stream received from the plurality of cameras 34, identify the light intensity level within the aircraft cabin, determine whether dimmable windows 28 are in the desired state, determine whether the IR illuminators should be utilized, determine whether dimmable windows 28 need to be controlled to ensure desired light intensity levels are achieved within the aircraft cabin, locate dimmable window 28 which is not in the desired state or needs to be controlled to meet the desired light intensity levels, alerts the aircraft passenger near the identified dimmable window 28, and commands central cabin controller 14 to set the identified dimmable window 28 to the desired state as determined by the phase of flight of the aircraft, as set by the aircraft crew members, or as required to meet the cabin light intensity levels within the aircraft cabin.

Processing unit 32 includes video capture module 40, video analyzer module 42, light intensity level identifier module 44, and window locator module 46. Video capture module 40, video analyzer module 42, light intensity level identifier module 44, and window locator module 46 are each a set of instructions (computer code, computer program, etc.) stored within processing unit 32 that are configured to be executed by processing unit 32 to perform specific tasks/operations. More specifically, video capture module 40 is configured to capture a video stream from the plurality of cameras 34. Video analyzer module 42 is configured to process the video stream from the plurality of cameras 34 and to adjust the video characteristics/parameters to remedy low light and low-resolution videos. Further, video analyzer module 42 is configured to process the video stream from the plurality of cameras 34 to extract identified features within the aircraft cabin. Light intensity level identifier module 44 is configured to analyze the processed video from the plurality of cameras 34 to identify the light intensity level within the aircraft cabin. Window locator module 46 is configured to analyze features extracted from the processed video to identify dimmable windows 28 which require an opacity level adjustment. Each of the listed tasks/operations performed by processing unit 32 will be discussed in detail below.

Processing unit 32 of ambient light controller 12 is electrically coupled to predefined configurations 38 and communication interface 36. Predefined configurations 38 are various configurable parameters related to the operation of ambient light controller 12. For example, predefined configurations 38 can be access information for connecting to and receiving information from avionics system 20, IFE server 24, and crew issued devices 22. In other examples, predefined configurations can be one or more guidelines defining when each of the dimmable windows 28 should have a high opacity level or a low opacity level, an overall light intensity threshold value, a predefined fire threshold light intensity value, and a light intensity threshold value based on the phase of flight of the aircraft, among other parameters/guidelines for operating processing unit 32. As such, predefined configurations 38 are the parameters that are upload into ambient light controller 12 to control the operation of processing unit 32 and the overall ambient light controller 12.

Communication interface 36 is electrically coupled to processing unit 32 and communicatively coupled to avionics system 20, crew issued devices 22, IFE server 24, and central cabin controller 14. Communication interface 36 can be a wired or wireless communication link between each respective component. Further, throughout the disclosure it is stated that components are electrically coupled to one another. It is to be understood that electrically coupling components can be achieved through a wired or wireless communication link. In some non-limiting examples, a wireless communication link can include Bluetooth, Wi-Fi, Cellular, and Wireless Avionics Intra-Communication (WAIC), among other wireless communication techniques. In other non-limiting examples, a wired communication link can include Ethernet, CAN, RS422/232, USB, ARINC 429, fiber optic communication, and Avionics Full-Duplex Switched Ethernet (AFDX), among other wired communication techniques. Communication interface 36 is configured to transfer/receive communication signals from each of central cabin controller 14, avionics system 20, crew issued devices 22, and IFE server 24.

In operation, one or more of the plurality of cameras 34 within the aircraft cabin continuously monitors and captures video within the aircraft cabin. Video capture module 40 captures a video stream from the plurality of cameras 34. Video analyzer module 42 preprocesses the video stream from the plurality of cameras 34, which includes adjusting and compensating for video issues related to low light and low-resolution video. In low-light situations, the infrared illuminators are automatically activated to compensate for the low-light in the aircraft cabin, improving the video quality of the video. Further, video analyzer module 42 extracts features/information from the video stream, such as the ambient light intensity and the relative angle of the ambient light entering the aircraft cabin. Light intensity level identifier module 44 analyze the preprocessed video received from video analyzer module 42 to determine the light intensity level inside the aircraft cabin. The aircraft cabin light intensity level is determined based on the known fixed internal cabin light sources like exit signs, reading lights, ceiling lights, and lights from open lavatories, among other internal lights. The light intensity level determined by light intensity level identifier module 44 is used as a threshold intensity level by window locator module 46. Window locator module 46 analyzes the features extracted by video analyzer module 42 for each of the plurality of cameras 34, and window locator module 46 compares the peak light intensity (lux) seen by each of the plurality of cameras 34 to the cabin light intensity threshold.

If the peak light intensity is above the cabin light intensity threshold, then window locator module 46 utilizes the angle at which peak light intensity is viewed by the plurality of cameras 34 to locate dimmable window 28 through which the ambient light enters the aircraft cabin. Window locator module 46 utilizes localization methods (e.g. triangulation methods) to locate dimmable window 28 through which the ambient light enters the aircraft cabin (a.k.a. window of interest). After processing unit 32 locates a dimmable window 28 that needs to be adjusted, processing unit 32 determines the desired state of dimmable window 28 based on the current phase of flight of the aircraft or as set by the aircraft crew members. In some examples, processing unit 32 determines the current phase of flight of the aircraft based on information received from avionics system 20. In other examples, processing unit 32 determines the desired state of dimmable window 28 based on parameters set by the aircraft crew members, if the system configuration has been overridden to use the window state set by the aircraft crew members.

Processing unit 32 determines whether the opacity level of dimmable window 28 needs to be adjusted by comparing the current state (open [low-opacity level] or closed [high-opacity level]) of dimmable window 28 to the desired state of dimmable window 28. Further, processing unit 32 determines whether system 10 is preconfigured (through predefined configurations 38) for automatic control of dimmable window 28. If system 10 is preconfigured for automatic control, then processing unit 32 sends command signals to central cabin controller 14, through communication interface 36, to adjust the opacity level of dimmable window 28 of interest. In some examples, ambient light controller 12 adjusts dimmable window 28 to a low opacity level during takeoff and landing of the aircraft, allowing the aircraft passengers to see out dimmable window 28 during takeoff and landing of the aircraft. In other examples, ambient light controller 12 adjusts dimmable window 28 to a high opacity level during cruise phase of flight, preventing light from entering the aircraft cabin to allow the aircraft passengers to sleep during cruise phase of flight. In some examples, the cruise phase of flight can be after sunset and before sunrise. In other examples, the cruise phase of flight can be any period of darkness outside the aircraft.

Processing unit 32 can also initiate a message being displayed on seat display unit 26 of the passenger seated closest to dimmable window 28 of interest through communication interface 36 and IFE server 24, indicating that dimmable window 28 is being controlled remotely by ambient light controller 12. In addition, if system 10 is preconfigured for 'remote manual' control, then system 10 broadcasts approval requests to crew access panel 18 and/or crew issued devices 22 (portable tablets, smartphones, smart watches, etc.) upon an aircraft passenger attempting to adjust the opacity level of dimmable window 28. Any aircraft crew member can accept, reject, or ignore the received approval request to adjust the opacity level of dimmable window 28.

Figure 3B:
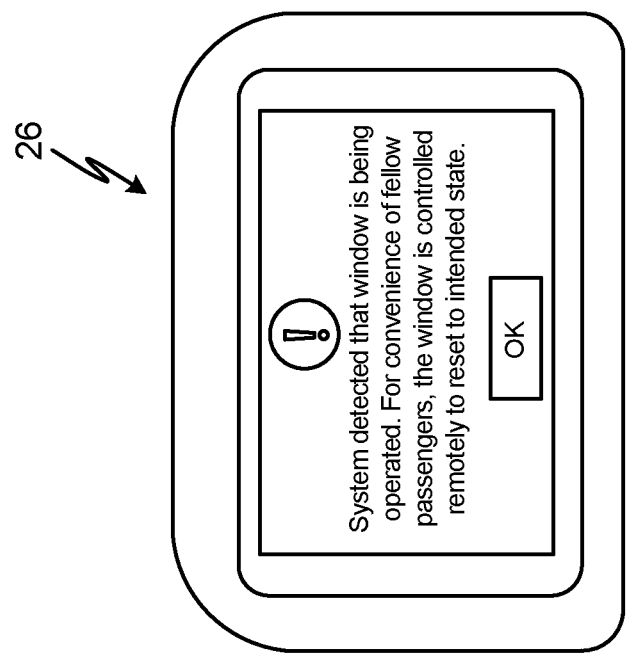
FIG. 3B is an illustration of an example message on a passenger seat display unit within an aircraft.
Figure 3A:
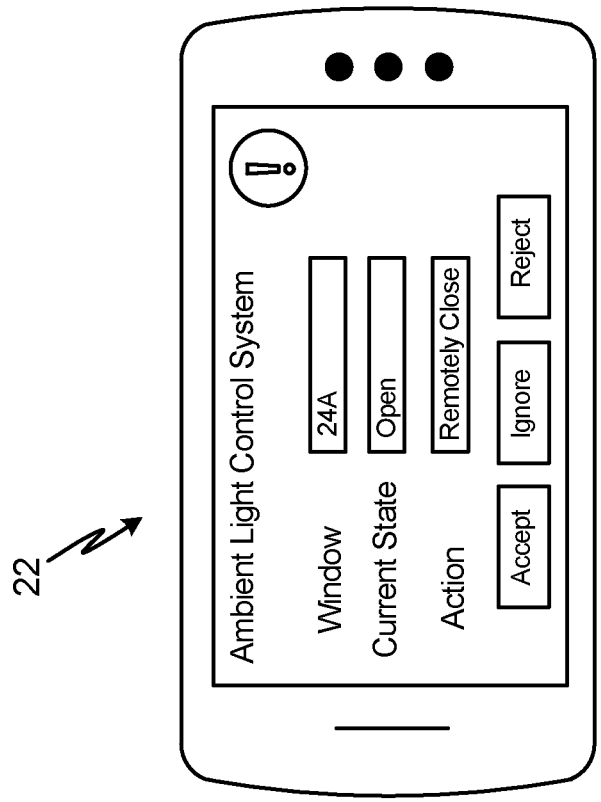
FIG. 3A is an illustration of an example crew issued device of the control system.

FIG. 3A is an illustration of an example crew issued device 22 of system 10. FIG. 3A illustrates the interface/message an aircraft crew member will see on crew issued device 22 after a passenger adjusts the opacity level of dimmable window 28 and processing unit 32 requests approval to adjust the opacity level of dimmable window 28. As shown, the aircraft crew member will see information such as for which dimmable window 28 is the permission requested, the current state of dimmable window 28 (open or closed), and the action that is requested. Further, the aircraft crew member can interact with crew issued device 22 to accept, reject, or ignore the request. FIG. 3B is an illustration of an example message on passenger seat display unit 26 within an aircraft. More specifically, FIG. 3B illustrates a message that can be displayed on seat display unit 26 after a passenger adjusts the opacity level of dimmable window 28 and upon ambient light controller 12 automatically adjusting the opacity level of dimmable window 28.

If the processing unit 32 request to adjust dimmable window 28 is accepted by an aircraft crew member, system 10 automatically generates and sends a window control command to central cabin controller 14 and all future processing unit 32 requests to adjust the dimmable window 28 are automatically accepted by system 10 for that specific dimmable window 28 (i.e. future requests are not shared with the crew for that window). If the processing unit 32 request to adjust the dimmable window 28 is ignored (or no action is taken) by the aircraft crew members, system 10 does not generate control commands for that specific dimmable window 28, and future requests will be shared with the aircraft crew members for approval. If the processing unit 32 request to adjust the dimmable window 28 is rejected (or not approved) by the aircraft crew members, system 10 does not generate control commands for that specific dimmable window 28 and no future requests are sent to the aircraft crew members for approval for that window. In some examples, system 10 may be configured to seek approval from the aircraft passengers (e.g. business class passengers or first-class passengers) before dimmable windows 28 are remotely controlled by the aircraft crew members or ambient light controller 12. As such, system 10 can be configured to allow or prevent aircraft passengers from adjusting the opacity level of individual dimmable windows 28 throughout the flight of the aircraft.

System 10 can be expanded to include other vision-based functionalities, such as detecting and locating a fire within an aircraft cabin. System 10 can be configured to continuously monitor and capture video within the aircraft cabin using the plurality of cameras 34 positioned within the aircraft cabin. Processing unit 32 can be utilized to identifying light within the aircraft cabin, and then processing unit 32 can calculate a peak light intensity level of the light within the aircraft cabin. Further, processing unit 32 compares the peak light intensity level of the light within the aircraft cabin to a predefined fire light intensity threshold value stored within predefined configurations 38 of ambient light controller 12. The predefined fire light intensity threshold value is a user input value for a range of light intensity levels of a typical fire. Processing unit 32 can identify the presence of fire within the aircraft cabin upon the peak light intensity level of the light within the aircraft cabin exceeding the predefined fire light intensity threshold value. In addition, processing unit 32 can identify the location of the fire within the aircraft cabin by identifying features within the aircraft cabin adjacent the fire. After identifying and locating a fire within the aircraft cabin, processing unit 32 transfers a warning signal through communication interface 36 to central cabin controller 14 indicating that a fire has been detected and located within the aircraft cabin. In other examples, system 10 can utilize cameras 34 with thermal vision capabilities to detect a temperature indicative of a fire within the aircraft cabin. As such, system 10 can be used to continuously monitor the aircraft cabin for the presence of fire during the duration of the flight of the aircraft.

System 10 is an automatic ambient light monitoring and control system that ensures the ambient light entering the aircraft cabin is at the desired levels by implementing a highly accurate video surveillance system that performs highly complex video analytic algorithms. System 10 automatically detects which passenger windows are not in the desired stated based on phase of flight or crew issued commands and then adjusts the opacity level of dimmable window 28 to achieve the desired state. Further, system 10 automatically detects and locates fire within the aircraft cabin and then alerts the aircraft crew about the fire, improving overall safety for the aircraft and the passengers. System 10 can easily be expanded to perform future video surveillance and analytics within the aircraft cabin. System 10 continuously monitors the aircraft cabin during the flight of the aircraft to ensure compliance to regulatory standards, passenger comfort, and passenger safety.

Figure 4A:
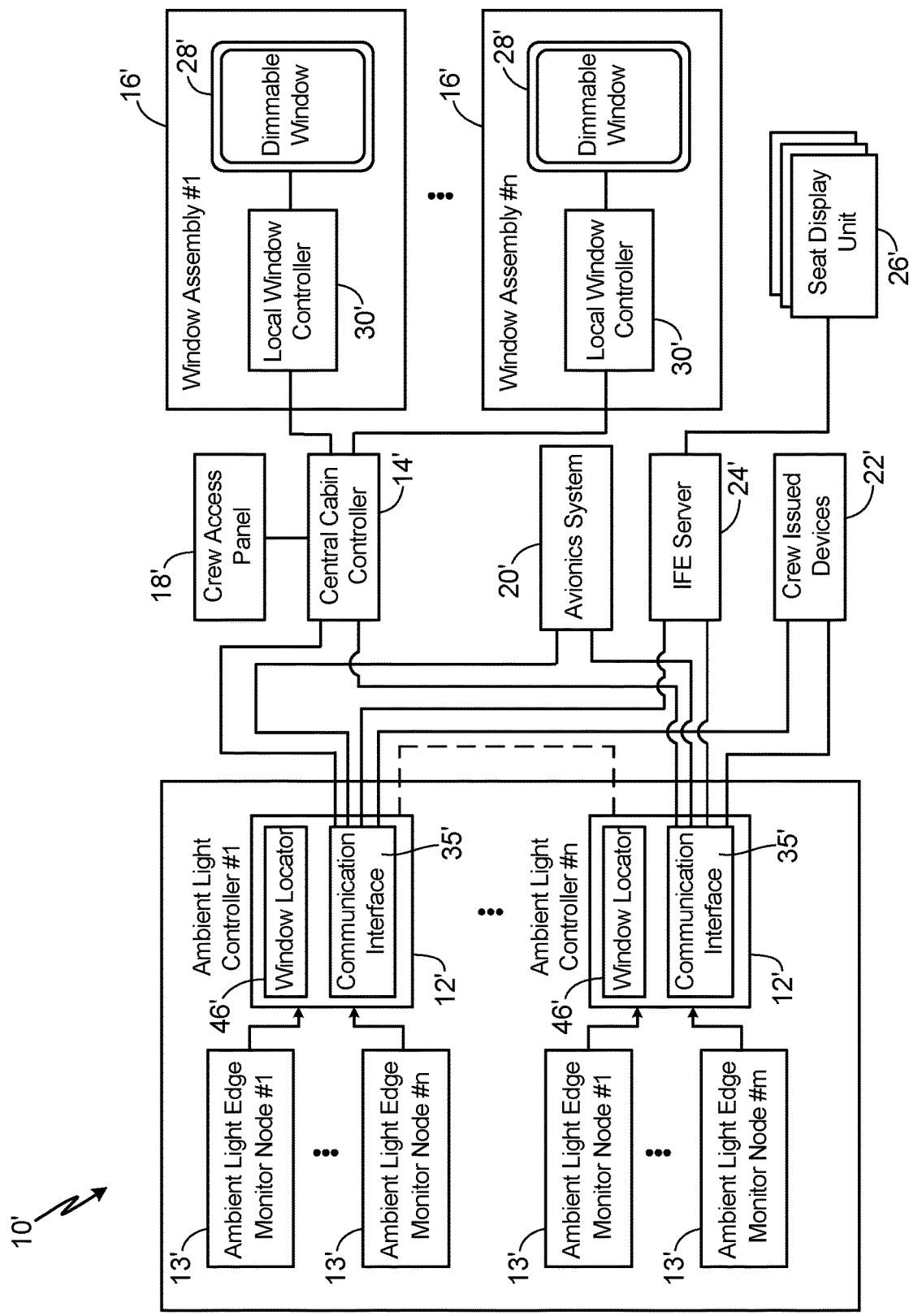
FIG. 4A is a schematic block diagram of a node-based aircraft cabin ambient light control system.
Figure 4B:
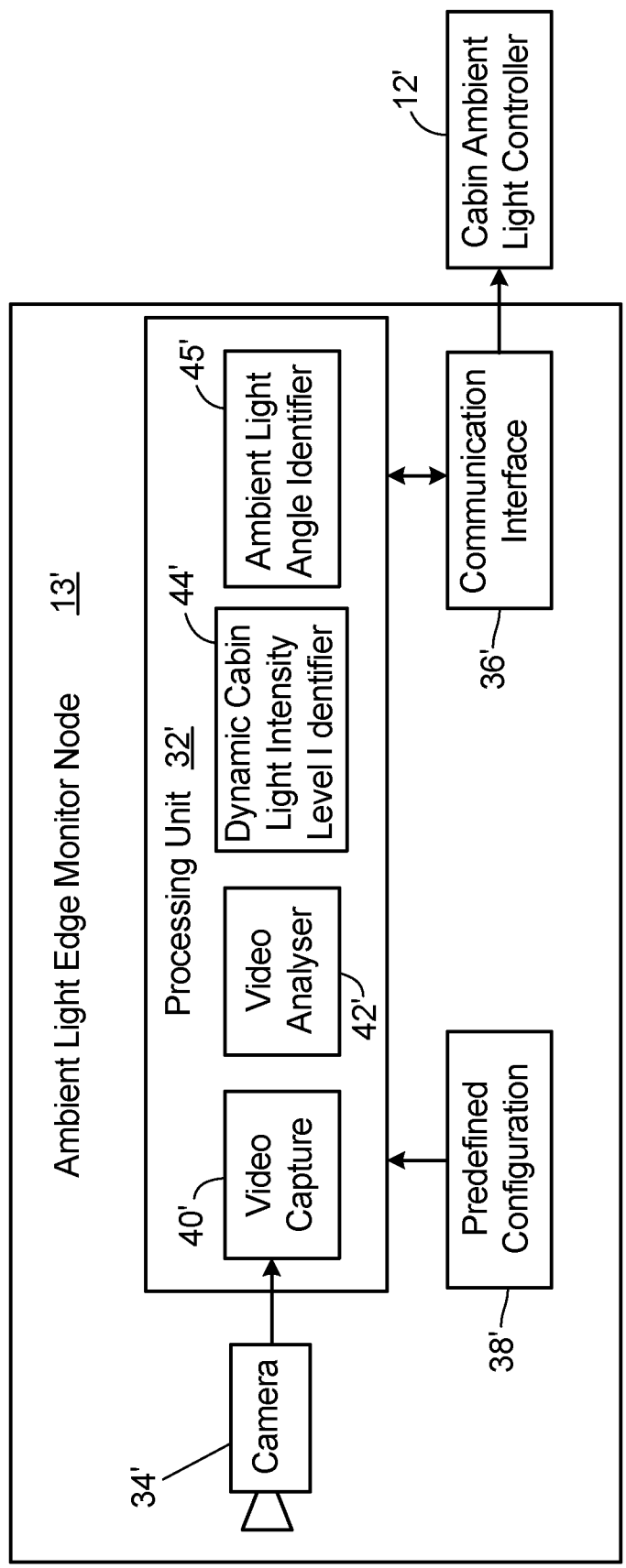
FIG. 4B is a schematic block diagram of an ambient light edge monitor node of the system of FIG. 4A.

FIG. 4A is a schematic block diagram of node-based aircraft cabin ambient light control system 10'. FIG. 4B is a schematic block diagram of ambient light edge node 13' of system 10' shown in FIG. 4A. FIGS. 4A-4B will be discussed together. System 10' of FIGS. 4A-4B is substantially similar to system 10 of FIG. 1. Therefore, it is to be understood that the description of the overall operation and functionality of system 10 equally applies to system 10', except where noted. A main difference between system 10' and system 10 is that system 10' (FIGS. 4A-4B) is a node-based system, as described below.

System 10' includes at least one ambient light controller 12', at least one ambient light edge node 13', central cabin controller 14', at least one window assembly 16', crew access panel 18', avionics system 20', crew issued devices 22', inflight entertainment (IFE) server 24', and seat display unit 26'. Each of the at least one ambient light controllers 12' includes communication interface 35' and window locator module 46'. Each of the at least one ambient light edge nodes 13' includes processing unit 32', camera 34', communication interface 36', and predefined configurations 38'. Further, processing unit 32' includes video capture module 40', video analyzer module 42', light intensity level identifier module 44', and ambient light angle identifier module 45'. As shown, the node-based system 10' can include a plurality of ambient light controllers 12' each electrically coupled to at least one ambient light edge node 13'. Further, each individual ambient light edge node 13' includes its own camera 34' and processing unit 32' for capturing and analyzing the video captured by an individual camera 34'.

As such, system 10' provides a solution in which each of the at least one ambient light edge nodes 13' captures its own video from a single camera 34', processes the video for light intensity levels within the aircraft cabin, and the transfers the processed video to an ambient light controller 12'. Ambient light controller 12' can analyze the video to determine which dimmable window 28' needs to be adjusted and then can send a signal to central cabin controller 14' to adjust dimmable window 28' of interest. Therefore, system 10' achieves the same overall purpose as system 10 of FIG. 1. A main advantage of system 10' over system 10 is that system 10' requires less processing power for ambient light controllers 12' because each individual ambient light edge node 13' processes the video it captures before transferring the video. Further, the node-based system 10' required less overall power to operate, and ambient light edge nodes 13' can be operated using battery power or an energy harvesting device such as solar-panels. Further, the node-based system 10' allows a plurality of ambient light edge nodes 13' to be added to system 10' at any time, and the data collected from each additional ambient light edge node 13' is sent to ambient light controller 12' for processing and use by system 10'. Overall, system 10' of FIGS. 4A-4B achieves the same results as system 10 of FIG. 1, but system 10' is an efficient and modular system that can continuously and easily be added to in the future.

Figure 5A:
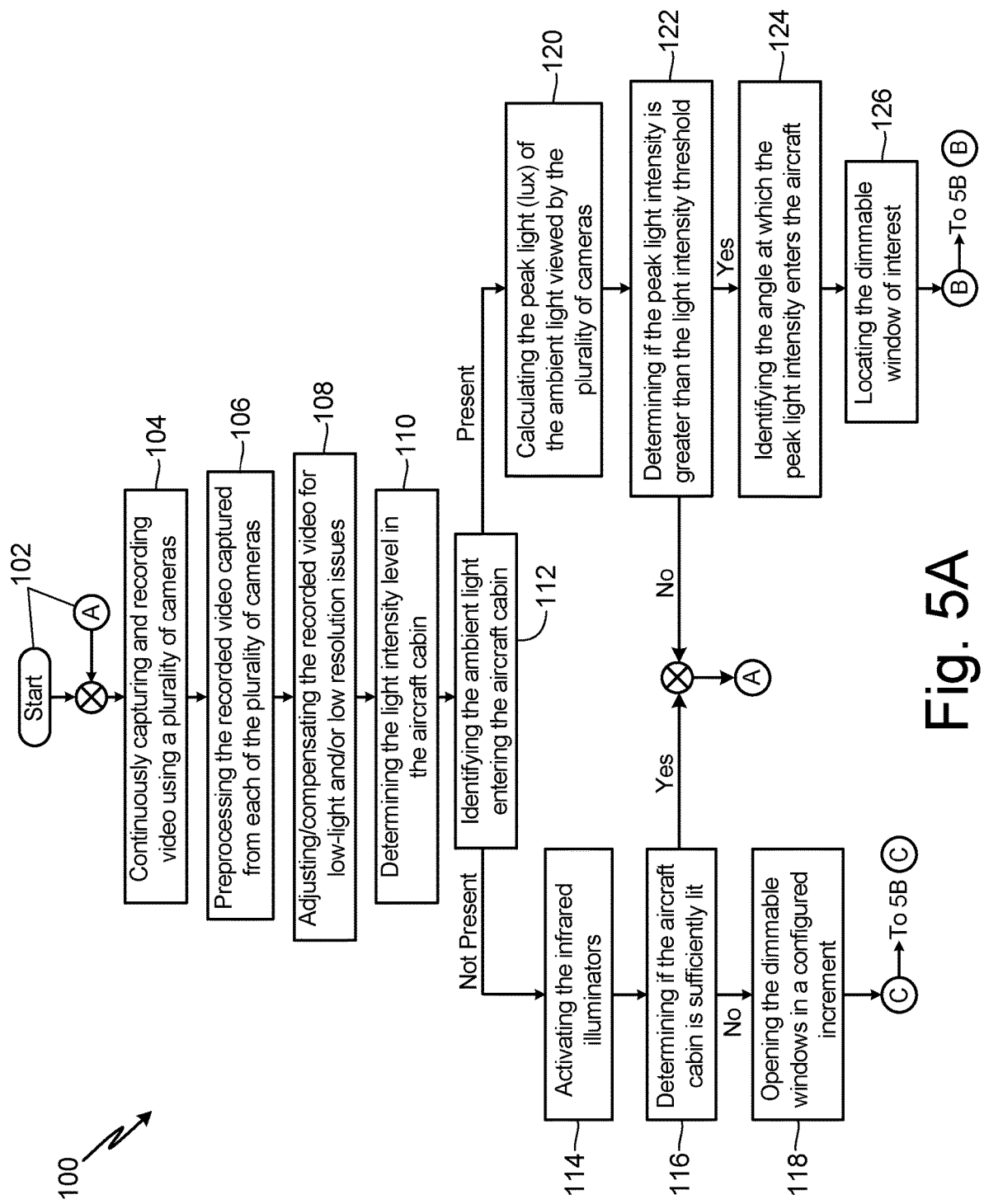
FIG. 5A is a first schematic flow chart showing the method of operating the aircraft cabin ambient light control system.
Figure 5B:
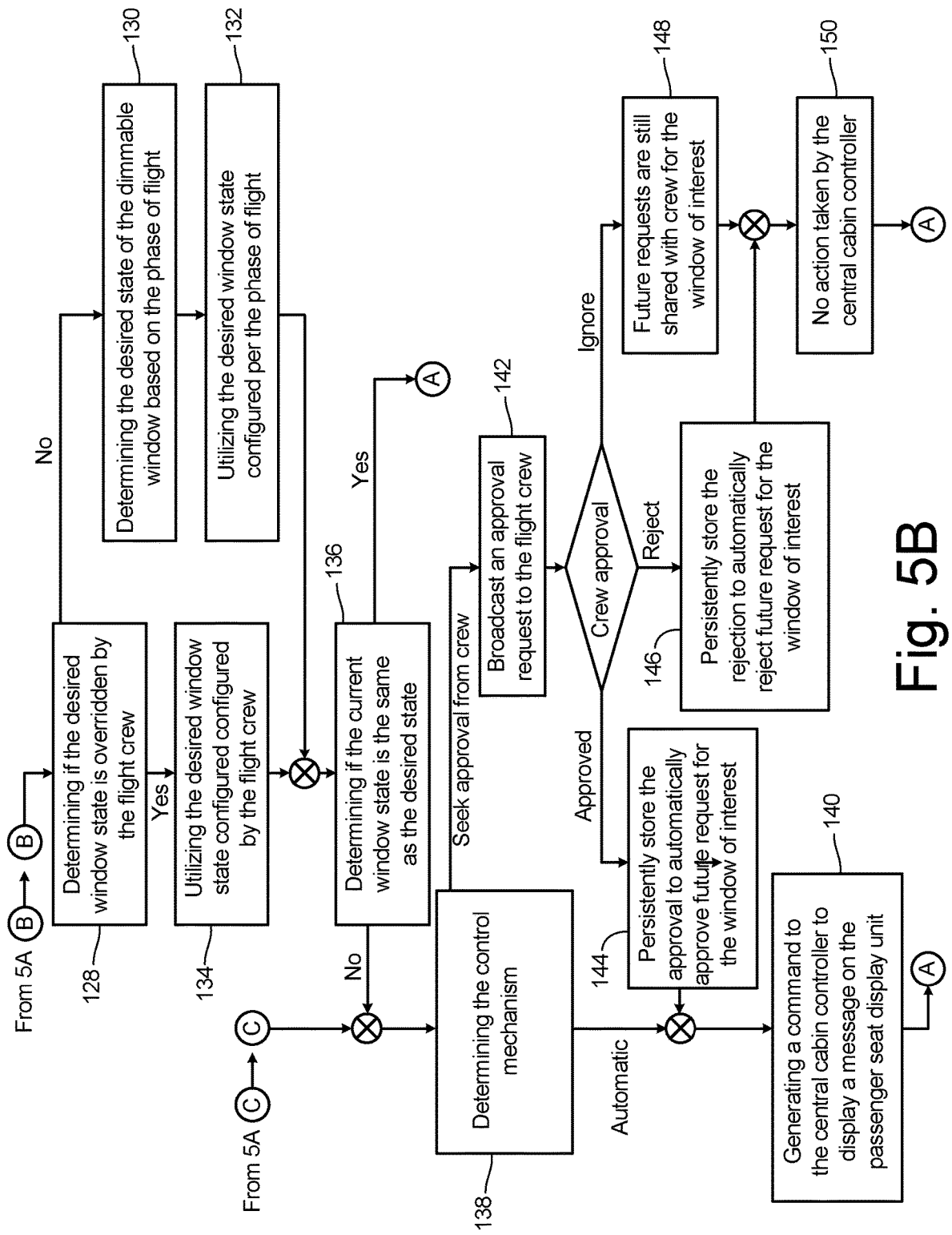
FIG. 5B is a second schematic flow chart and a continuation of FIG. 5A showing the method of operating the aircraft cabin ambient light control system.

FIGS. 5A and 5B are schematic flow charts showing method 100 of operating aircraft cabin ambient light control system 10. FIGS. 5A and 5B will be discussed together. Method 100 includes steps 102-150. Method 100 begins at start 102 and proceeds to step 104, which includes continuously capturing video using plurality of cameras 34. Step 106 includes preprocessing the video stream captured from each of the plurality of cameras 34. Step 108 includes adjusting/compensating the video stream for low-light and/or low-resolution issues. Step 110 includes determining the light intensity level in the aircraft cabin. Step 112 includes identifying ambient light entering the aircraft cabin. If ambient light is not entering the aircraft cabin, method 100 proceeds to step 114, which includes activating the infrared illuminators. Step 116 includes determining if the aircraft cabin is sufficiently lit. If the aircraft cabin is sufficiently lit, method 100 returns back to start 102 and method 100 proceeds through the steps again. If the aircraft cabin is not sufficiently lit, method 100 proceeds to step 118, which includes opening dimmable windows 28 in a configured increment to allow some ambient light to enter the aircraft cabin. Method 100 then proceeds to step 138, which will be discussed below.

Returning to step 112, if ambient light is entering the aircraft cabin, method 100 proceeds to step 120, which includes calculating the peak light intensity (lux) of the ambient light viewed by the plurality of cameras 34. Step 122 includes determining if the peak light intensity is greater than the light intensity threshold. If the peak light intensity is not greater than the light intensity threshold, method 100 returns back to start 102 and method 100 proceeds through the steps again. If the peak light intensity is greater than the light intensity threshold, method 100 proceeds to step 124, which includes identifying the angle at which the peak light intensity enters the aircraft cabin. Step 126 includes locating the dimmable window 28 of interest. Step 128 includes determining if the desired window state is overridden by the flight crew. If the desired window state is not overridden by the flight crew, method 100 proceeds to step 130, which includes determining the desired state of the dimmable window based on the phase of flight. Step 132 includes utilizing the desired window state configured per the phase of flight. Method 100 proceeds to step 136, discussed below. Returning to step 128, if the desired window state is overridden by the flight crew, method 100 proceeds to step 134, which includes utilizing the desired window state configured by the flight crew. Step 136 includes determining if the current window state (opacity level) is the same as the desired state. If the current window state is the same as the desired window state, method 100 returns back to start 102 of method 100.

If the current window state is not the same as the desired window state, method 100 proceeds to step 138, which includes determining the control mechanism. If the control mechanism is automatic by processing unit 32, method 100 proceeds to step 140, which includes generating commands to the central cabin controller 14 to display a message on the passenger seat display unit 26. After displaying the message on passenger seat display unit 26, method 100 returns back to start 102 of method 100. If the control mechanism must seek approval from the flight crew, method 100 proceeds to step 142, which includes broadcasting an approval request to the flight crew. If the flight crew approves the request, method 100 proceeds to step 144, which includes the processing unit 32 persistently storing the approval to automatically approve future requests for the window of interest. Method 100 then proceeds to step 140 of generating commands to the central cabin controller 14 to display a message on the passenger seat display unit 26. If the flight crew rejects the request, method 100 proceeds to step 146, which includes the processing unit persistently stores the rejection to automatically reject future requests for the window of interest. Method 100 proceeds to step 150, in which no action is taken by the central cabin controller 14 and method 100 returns back to start 102 of method 100. If the flight crew ignores the request, method 100 proceeds to step 148, which includes future requests are still shared with crew for the window of interest. Method 100 proceeds to step 150, in which no action is taken by the central cabin controller 14 and method 100 returns back to start 102 of method 100. Method 100 provides the steps for continuously monitoring the ambient light entering an aircraft cabin through dimmable windows 28 and automatically resetting the state of the electrically dimmable windows 28 to ensure compliance to specific light conditions per phase of flight or as set by the flight crew.

DISCUSSION OF POSSIBLE EMBODIMENTS

The following are non-exclusive descriptions of possible embodiments of the present invention.

An aircraft cabin ambient light control system for monitoring and controlling the light intensity level within an aircraft cabin, the system comprising: a dimmable window having an electrically controllable opacity level; a central cabin controller electrically coupled to the dimmable window; and an ambient light controller electrically coupled to the central cabin controller, wherein the ambient light controller comprises a processing unit electrically coupled to a plurality of cameras and a communication interface, and wherein: the plurality of cameras continuously capture video within the aircraft cabin and transfer the video stream to the processing unit; the processing unit analyzes the video and identifies a light intensity level within the aircraft cabin; the communication interface sends data to the electrically coupled central cabin controller; and the central cabin controller sends a command signal to the dimmable window to control the opacity level of the dimmable window.

The aircraft cabin ambient light control system of the preceding paragraph can optionally include, additionally and/or alternatively, any one or more of the following features, configurations and/or additional components:

A local window controller electrically coupled to and positioned between the dimmable window and the central cabin controller, wherein the local window controller receives the command signal from the central cabin controller, and wherein the local window controller controls the opacity level of the dimmable window.

The aircraft includes a plurality of dimmable windows; each of the plurality of dimmable windows are electrically coupled to a single local window controller; and each of the local window controllers are positioned between and electrically coupled to the central cabin controller and one of the plurality of dimmable windows.

A crew access panel electrically coupled to the central cabin controller, wherein an aircraft crew member interacts with the crew access panel to manually control the opacity level of the dimmable window.

The aircraft crew member interacts with the crew access panel to allow or prevent an aircraft passenger from controlling the opacity level of the dimmable window.

The processing unit comprises: a video capture module configured to capture the video from the plurality of cameras; a video analyzer module configured to process the video from the plurality of cameras to remedy low light and low-resolution videos; a light intensity level identifier module configured to analyze the processed video from the plurality of cameras to identify the light intensity level within the aircraft cabin; and a window locator module configured to analyze features extracted from the processed video to identify dimmable windows which require an opacity level adjustment.

The ambient light controller transfers data through the communication interface to the central cabin controller to automatically control and adjust the dimmable window opacity level based on phase of flight data received from an avionics system within the aircraft.

The ambient light controller adjusts the dimmable window to a low opacity level during takeoff and landing of the aircraft, and wherein the ambient light controller adjusts the dimmable window to a high opacity level during cruise phase of flight.

The ambient light controller is configured to detect and locate a fire within the aircraft cabin, and wherein the ambient light controller transfers a warning signal through the communication interface to the central cabin controller indicating that a fire has been detected and located within the aircraft cabin.

The ambient light controller detects a fire within the aircraft cabin by comparing and identifying that the light intensity level within the aircraft cabin has exceeded a predefined fire threshold light intensity value.

The following are further non-exclusive descriptions of possible embodiments of the present invention.

A method of operating an aircraft cabin ambient light control system, the method comprising: continuously capturing, by a plurality of cameras positioned with an aircraft cabin, a video stream; identifying, by a processing unit, ambient light entering the aircraft cabin; calculating, by the processing unit, a peak light intensity of the ambient light entering the aircraft cabin; comparing, by the processing unit, the peak light intensity to a cabin light intensity threshold; identifying, by the processing unit, an angle of the peak light intensity entering the aircraft cabin to locate a dimmable window of interest; and adjusting an opacity level of the dimmable window if the peak light intensity entering the aircraft cabin deviates from the cabin light intensity threshold.

The method of the preceding paragraph can optionally include, additionally and/or alternatively, any one or more of the following features, configurations and/or additional components:

Processing, by a video analyzer module of the processing unit, the video to determine the light intensity level within the aircraft cabin; adjusting, by the video analyzer module of the processing unit, the video to remedy low light and low-resolution video; and determining, by a light intensity level identifier module of the processing unit, a light intensity level of electrical lights within the aircraft cabin.

Determining, by the processing unit, a phase of flight of the aircraft; and establishing, by the processing unit, the peak light intensity of the ambient light entering the aircraft cabin based on the phase of flight of the aircraft.

Automatically adjusting the dimmable window to a low opacity level during takeoff of the aircraft; automatically adjusting the dimmable window to a low opacity level during landing of the aircraft; and automatically adjusting the dimmable window to a high opacity level during cruise phase of flight.

Adjusting, by an aircraft crew member interacting with a crew access panel, the opacity level of the dimmable window.

Preventing, through interaction with the crew access panel, an aircraft passenger from adjusting the opacity level of the dimmable window; wherein an aircraft crew member can accept or reject, through interaction with the crew access panel, an aircraft passengers request to adjust the opacity level of the dimmable window.

Displaying a message on a passenger seat display unit indicating the attempt to adjust the opacity level of the dimmable window was accepted or rejected.

A local window controller is electrically coupled to the dimmable window, and wherein the local window controller is configured to control the opacity level of the dimmable window.

The following are further non-exclusive descriptions of possible embodiments of the present invention.

A method of identifying a fire within an aircraft cabin, the method comprising: continuously capturing, by a plurality of cameras positioned with an aircraft cabin, a video stream; identifying, by a processing unit, light within the aircraft cabin; calculating, by the processing unit, a peak light intensity of the light within the aircraft cabin; comparing, by the processing unit, the peak light intensity to a predefined fire light intensity threshold value; identifying, by the processing unit, the presence of fire within the aircraft cabin upon the peak light intensity exceeding the predefined fire light intensity threshold value.

The method of the preceding paragraph can optionally include, additionally and/or alternatively, any one or more of the following features, configurations and/or additional components:

Identifying, by the processing unit, a location of the fire within the aircraft cabin by identifying features within the aircraft cabin adjacent the fire; and transferring, by the processing unit, a warning signal through a communication interface to a central cabin controller indicating that a fire has been detected and located within the aircraft cabin.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An aircraft cabin ambient light control system for monitoring and controlling the light intensity level within an aircraft cabin, the system comprising:
   a dimmable window having an electrically controllable opacity level;
   a central cabin controller electrically coupled to the dimmable window;
   and an ambient light controller electrically coupled to the central cabin controller, wherein the ambient light controller comprises a processing unit electrically coupled to a plurality of cameras and a communication interface, and wherein:
   the plurality of cameras continuously capture video within the aircraft cabin and transfer the video stream to the processing unit;
   the processing unit analyzes the video and identifies a light intensity level within the aircraft cabin;
   the communication interface sends data to the electrically coupled central cabin controller;
   the central cabin controller sends a command signal to the dimmable window to control the opacity level of the dimmable window;

wherein the processing unit comprises:
a video capture module configured to capture the video from the plurality of cameras;
a video analyzer module configured to process the video from the plurality of cameras to remedy low light and low-resolution videos;
a light intensity level identifier module configured to analyze the processed video from the plurality of cameras to identify the light intensity level within the aircraft cabin; and
a window locator module configured to analyze features extracted from the processed video to identify dimmable windows which require an opacity level adjustment.

2. The system of claim 1 and further comprising a local window controller electrically coupled to and positioned between the dimmable window and the central cabin controller, wherein the local window controller receives the command signal from the central cabin controller, and wherein the local window controller controls the opacity level of the dimmable window.

3. The system of claim 2, wherein:
the aircraft includes a plurality of dimmable windows;
each of the plurality of dimmable windows are electrically coupled to a single local window controller; and
each of the local window controllers are positioned between and electrically coupled to the central cabin controller and one of the plurality of dimmable windows.

4. The system of claim 1 and further comprising a crew access panel electrically coupled to the central cabin controller, wherein an aircraft crew member interacts with the crew access panel to manually control the opacity level of the dimmable window.

5. The system of claim 4, wherein the aircraft crew member interacts with the crew access panel to allow or prevent an aircraft passenger from controlling the opacity level of the dimmable window.

6. The system of claim 1, wherein the ambient light controller transfers data through the communication interface to the central cabin controller to automatically control and adjust the dimmable window opacity level based on phase of flight data received from an avionics system within the aircraft.

7. The system of claim 6, wherein the ambient light controller adjusts the dimmable window to a low opacity level during takeoff and landing of the aircraft, and wherein the ambient light controller adjusts the dimmable window to a high opacity level during cruise phase of flight.

8. The system of claim 1, wherein the ambient light controller is configured to detect and locate a fire within the aircraft cabin, and wherein the ambient light controller transfers a warning signal through the communication interface to the central cabin controller indicating that a fire has been detected and located within the aircraft cabin.

9. The system of claim 8, wherein the ambient light controller detects a fire within the aircraft cabin by comparing and identifying that the light intensity level within the aircraft cabin has exceeded a predefined fire threshold light intensity value.

* * * * *